(No Model.)
T. B. TAYLOR.
CEREAL FOOD AND PROCESS OF MANUFACTURING IT.
No. 453,364. Patented June 2, 1891.
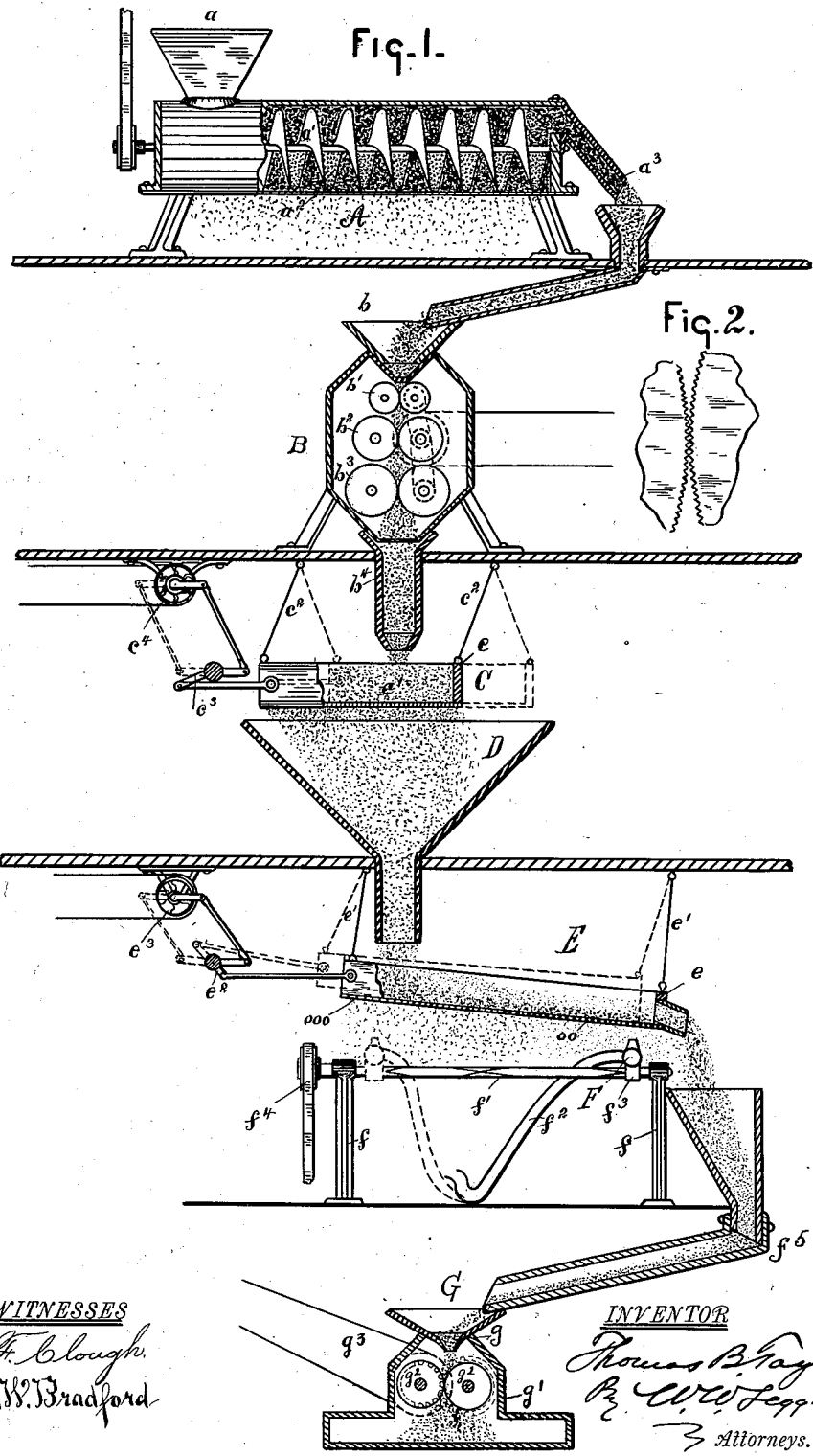
WITNESSES
F. Clough.
D. W. Bradford
INVENTOR
Thomas B. Taylor.
By W. W. Leggett
Attorneys.

UNITED STATES PATENT OFFICE.

THOMAS B. TAYLOR, OF JACKSON, MICHIGAN.

CEREAL FOOD AND PROCESS OF MANUFACTURING IT.

SPECIFICATION forming part of Letters Patent No. 453,364, dated June 2, 1891.

Application filed March 2, 1891. Serial No. 383,369. (No model.)

*To all whom it may concern:*

Be it known that I, THOMAS B. TAYLOR, a citizen of the United States, residing at Jackson, county of Jackson, State of Michigan, have invented a certain new and useful Improvement in Cereal Foods and the Process of Manufacturing them; and I do declare the following to be a full, clear, and exact description of the invention, such as will enable others skilled in the art to which it pertains to make and use the same, reference being had to the accompanying drawings, which form a part of this specification.

It is the object of my invention to produce and supply to the public a very nutritious and easily-digested cereal food, and the method of producing this food is very simple.

My invention consists in a certain new and valuable cereal food, together with a very simple process of manufacturing the same.

In the drawings, Figure 1 is a sectional view showing the machinery which may be used in the process and in each consecutive step thereof. Fig. 2 is a detail view showing the nature of the corrugations on the rolls in chamber B.

A represents the scourer or cleaner with parts broken away, into which the wheat first enters. $a$ is the hopper. $a'$ is a screw adapted to scour and clean the wheat and to discharge the same. $a^2$ represents perforations and screens at the bottom of the scourer for the delivery of the scourings. $a^3$ is a spout adapted to carry the wheat from the scourer.

B is a six-roller mill. $b$ is the hopper. $b'$ represents a pair of rollers with eight corrugations to every inch of the periphery of the rollers, and the said corrugations run lengthwise of the rollers. $b^2$ represents a pair of rollers with twelve corrugations to the inch. $b^3$ represents a pair of rollers with sixteen corrugations to the inch. The nature of these corrugations is shown in Fig. 2, the only difference on the different pairs of rollers being the number of corrugations to the inch. $b^4$ is a spout adapted to deliver the ground wheat from the mill.

C is a scalping-sieve with parts broken away. $c$ is the frame or box of the sieve. $c'$ is the mesh. $c^2$ represents the pivoted arms on which the sieve swings. $c^3$ is the actuating-crank, which reciprocates the sieve. $c^4$ is the pulley-wheel, to which the power is belted. The dotted lines represent another position of the mechanism.

D is the hopper, which receives the food after it has passed through the scalping-sieve.

E is the silk sieve which receives the food from the hopper D. $e$ is the frame. This sieve is provided with two sizes of bolting-silk, No. 000 and No. 00, the meshes of which are shown enlarged. $e'$ shows the supporting pivoted arms. $e^2$ is the actuating-crank; $e^3$, the pulley-wheel and belting. The dotted lines show another position of the sieve.

F is an apparatus for supplying a blast of air to the silk sieve E. $f$ represents uprights provided with bearings. $f'$ is a double-threaded screw resting in the said bearings. $f^2$ is a flexible tube adapted to convey the desired air from a conveniently-situated blower. $f^3$ is a nut attached to the said tube and adapted to travel and to carry the tube back and forth beneath the silk sieve by the continuous rotation of the double-threaded screw. $f^4$ represents the pulley-wheel and belting. The dotted lines show another position of the air-tube. $f^5$ represents the spout receiving and conveying the food from the silk sieve to a two-roller mill.

G represents the two-roller mill. $g$ represents the hopper of the mill; $g'$, the frame; $g^2$, the two rollers. These rolls are smooth and have a slight differential movement or speed—that is, one roll rotates slightly faster than the other. $g^3$ represents the pulley-wheel and belting.

The constituent parts of wheat are about as follows: ten parts of water, two parts of gum, four parts of sugar, seventy-two parts of starch, and twelve parts of gluten, all of which are surrounded by the tegument or hull, which when ground forms the bran.

My new food consists of the water, gum, sugar, and gluten of the wheat, together with a small proportion of the starch and finer bran, the proportional parts of the food being about two of gum, four of sugar, twelve of gluten, and four of starch, the water element varying somewhat with the wheat used, and as far as the food is concerned it may be considered as absent, since in cooking the water element is always greatly increased. The larger portion of the starch being taken out, the food is much more digestible, since the inability to digest starch foods is the most common form of indigestion, and since the absence of the starch leaves the glutinous portion of the wheat freer and less mixed in the stomach, and therefore the gastric juice can much more easily and readily permeate and disolve the gluten. Again, by removing the coarse bran the food is rendered still more valuable, since stomachs which have lost any of their lining or mucous membrane cannot receive anything so harsh as bran, as it still more irritates rather than heals them. Moreover, a given quantity of this food, being principally of gluten, is much more nutritious than when the starch and bran are present, and it is therefore very valuable for dyspeptics, who must get enough nutriment without overloading the stomach.

The peculiarly rich color, the like flavor, and the delicious taste immediately recommend this food to dyspeptics and those having poor appetites; but not only are the color, flavor, taste, and constituent parts of this food of the greatest value in all phases of dyspepsia, but also the form or condition of the food is very important. The form is that of flakes, and these flakes add to the value of the food, because they afford a large surface for the action of heat in cooking, and therefore can be cooked very quickly, and because they afford a large surface for the action of the gastric juice, and can therefore be digested very quickly. Moreover, this flaky form makes the food a mild laxative, which is so necessary in dyspepsia.

The process of manufacturing this food is very simple and inexpensive, and is as follows: The wheat is first scoured and thoroughly cleaned. It is then reduced by a six-roller mill making three reductions, the first reduction as eight, the second reduction as twelve, and the third reduction as sixteen corrugations. After the reductions the stock passes into the scalping-sieve for removing the coarse bran, and then passes onto another sieve clothed with No. 00 and No. 000 silk cloth for removing, with the assistance of an air-blast, all the fine parts, the branny particles, and the fine starchy flour. From the silk sieve the food passes to a two-roller mill. These rolls are smooth and have a slight differential speed. The effect of these rolls is to soften the flakes and render them still more susceptible to heat and to the gastric juices.

What I claim is—

1. The flaky cereal food consisting of about the twelve parts of gluten, the four parts of sugar, the two parts of gum, and about five parts of the starch of the wheat, substantially as described.

2. The process of making the described flaky cereal food, said process consisting in first cleaning or scouring the wheat, then reducing or breaking the wheat three times, then scalping or separating the bran from the food, then bolting out or removing from the food the fine starchy flour, and finally smoothing or softening the food, substantially as described.

In testimony whereof I sign this specification in the presence of two witnesses.

THOMAS B. TAYLOR.

Witnesses:
 FRANK P. HAINES,
 MARION A. REEVE.